(12) United States Patent
Su et al.

(10) Patent No.: US 8,659,577 B2
(45) Date of Patent: Feb. 25, 2014

(54) TOUCH SYSTEM AND POINTER COORDINATE DETECTION METHOD THEREFOR

(75) Inventors: Tzung Min Su, Hsin-Chu (TW); Hsin Chia Chen, Hsin-Chu (TW); Chih Hung Lu, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 588 days.

(21) Appl. No.: 12/813,599

(22) Filed: Jun. 11, 2010

(65) Prior Publication Data

US 2011/0050644 A1  Mar. 3, 2011

(30) Foreign Application Priority Data

Aug. 28, 2009  (TW) ................. 98129072 A

(51) Int. Cl.
*G06F 3/042*   (2006.01)
(52) U.S. Cl.
USPC ............................................. 345/175
(58) Field of Classification Search
USPC .................................. 345/156–175
See application file for complete search history.

(56) References Cited

U.S. PATENT DOCUMENTS

| | | | |
|---|---|---|---|
| 6,930,804 B2 * | 8/2005 | Farrell | 358/474 |
| 6,947,032 B2 | 9/2005 | Morrison et al. | |
| 6,954,197 B2 * | 10/2005 | Morrison et al. | 345/158 |
| 7,411,575 B2 * | 8/2008 | Hill et al. | 345/156 |
| 8,115,753 B2 * | 2/2012 | Newton | 345/175 |
| 8,164,577 B2 * | 4/2012 | Tsuzaki et al. | 345/173 |
| 2005/0077452 A1 * | 4/2005 | Morrison et al. | 250/221 |
| 2007/0236454 A1 * | 10/2007 | Ung et al. | 345/158 |
| 2008/0012835 A1 * | 1/2008 | Rimon et al. | 345/173 |
| 2009/0277694 A1 * | 11/2009 | Hansen et al. | 178/18.03 |

FOREIGN PATENT DOCUMENTS

| | | | |
|---|---|---|---|
| JP | 2005215860 A | 8/2005 | |
| JP | 2006518076 A | 8/2006 | |

\* cited by examiner

*Primary Examiner* — Sumati Lefkowitz
*Assistant Examiner* — Joseph Fox

(57) ABSTRACT

A pointer coordinate detection method for a touch system includes the steps of: capturing an image window looking across a plate surface with at least one image sensor; identifying a height coordinate of a pointer relative to the touch system according to a variation of each column of pixels in the image window; and calculating a plane coordinate of the pointer relative to the touch system according to an image position of the pointer in the image window. The present invention further provides a touch system.

23 Claims, 5 Drawing Sheets

TOUCH SYSTEM AND POINTER COORDINATE DETECTION METHOD THEREFOR

CROSS REFERENCE TO RELATED APPLICATION

This application claims the priority benefit of Taiwan Patent Application Serial Number 098129072, filed on Aug. 28, 2009, the full disclosure of which is incorporated herein by reference.

BACKGROUND

1. Field of the Invention

This invention generally relates to a touch system and, more particularly, to a touch system and pointer coordinate detection method therefor.

2. Description of the Related Art

Please refer to FIG. 1, it shows a schematic diagram of a conventional touch system 90. The touch system 90 includes a touch surface 91, cameras 921-924, a plurality of light sources 93 and a processor 94, wherein the touch surface 91 is a reflecting mirror. The cameras 921-924 capture images looking across the touch surface 91 along the touch surface 91. When a user 8 uses his or her finger 81 to approach or to touch the touch surface 91, the cameras respectively capture image windows containing an image of the tip of the finger 81 blocking the light source 93 and a mirror image of finger 81 in the touch surface 91. The processor 94 is coupled to the cameras 921-924 and processes the image windows captured by every camera to determine whether the finger 81 is in contact with the touch surface 91 or not.

Please refer to FIGS. 2a to 2c, they respectively show a schematic diagram of an image window W captured by the cameras 921-924, wherein DA is a dark area in the image window W corresponding to background area and BA is a bright area in the image window W corresponding to the light source 93 or the touch surface 91. When the user does not use his or her finger 81 to approach the touch surface 91, the image window W captured by the cameras 921-924 is like the one shown in FIG. 2a, i.e. the image window W does not contain any pointer information therein. When the user 8 uses his or her finger 81 to approach, but not contact, the touch surface 91, the image window W captured by the cameras 921-924 is like the one shown in FIG. 2b, i.e. the image window W contains an image $I_{81}$ associated with the finger 81 and an image $I_{81}'$ associated with the mirror image of finger 81 therein. When the processor 94 identifies that there are bright pixels existing between the images $I_{81}$ and $I_{81}'$, the processor 94 identifies that the finger 81 approaches but not in contact with the touch surface 91. When the user uses his or her finger 81 to contact the touch surface 91, the image window W captured by the cameras 921-924 is like the one shown in FIG. 2c, i.e. the images $I_{81}$ and $I_{81}'$ in the image window W connect to each other. When the processor 94 identifies that no bright pixel exists between the images $I_{81}$ and $I_{81}'$, it identifies that the finger 81 is in contact with the touch surface 91. The detail of identifying whether a pointer is in contact with the touch surface 91 can be found in U.S. Pat. No. 6,947,032.

However, the touch system 90 can only identify whether a pointer is in contact with the touch surface 91 but can not calculate a hovering height of the pointer. Accordingly, the present invention further provides a touch system and pointer coordinate detection method therefor that can identify a hovering height and a plane location of a pointer relative to the touch surface 91 simultaneously.

SUMMARY

The present invention provides a touch system capable of detecting three dimensional coordinates of a hovering pointer and a pointer coordinate detection method therefor.

The present invention provides a pointer height detection method for a touch system including the steps of: capturing an image window looking across a plate surface with at least one image sensor; calculating a variation of each column of pixels in the image window; and comparing the variation of at least one column of pixels with the smallest variation in the image window and at least one threshold to indentify a height of a pointer relative to the plate surface.

The present invention further provides a pointer coordinate detection method for a touch system including the steps of: capturing an image window looking across a plate surface with at least one image sensor; identifying a height coordinate of a pointer relative to the touch system according to a variation of each column of pixels in the image window; and calculating a plane coordinate of the pointer relative to the touch system according to an image position associated with the pointer in the image window.

The present invention further provides a touch system including a plate, at least one reflecting unit, at least one image sensor and a processing unit. The light source illuminates the plate along the plate surface. The reflecting unit is configured to reflect light from the light source. The image sensor is configured to capture an image window containing an image of a pointer blocking the reflecting unit. The processing unit processes the image window and identifies a height coordinate of the pointer relative to the plate surface according to a variation of each column of pixels in the image window.

The touch system and the pointer coordinate detection method of the present invention may control an image display to execute different functions according to different height coordinates and plane coordinates of a pointer relative to the touch system; for example, but not limited to, controlling the image display to show a cursor motion, a writing function or a drawing function.

BRIEF DESCRIPTION OF THE DRAWINGS

Other objects, advantages, and novel features of the present invention will become more apparent from the following detailed description when taken in conjunction with the accompanying drawings.

FIGS. 3b-3c show schematic diagrams of image windows captured by the image sensor shown in FIG. 3a.

FIG. 4b shows a schematic diagram of an image window captured by the image sensor shown in FIG. 4a.

FIG. 5b shows a schematic diagram of image windows captured by the image sensors shown in FIG. 5a.

FIG. 6b shows a schematic diagram of one column of pixels of the image window shown in FIG. 6a.

DETAILED DESCRIPTION OF THE EMBODIMENT

It should be noticed that, wherever possible, the same reference numbers will be used throughout the drawings to refer to the same or like parts.

First Embodiment

Figure 1:
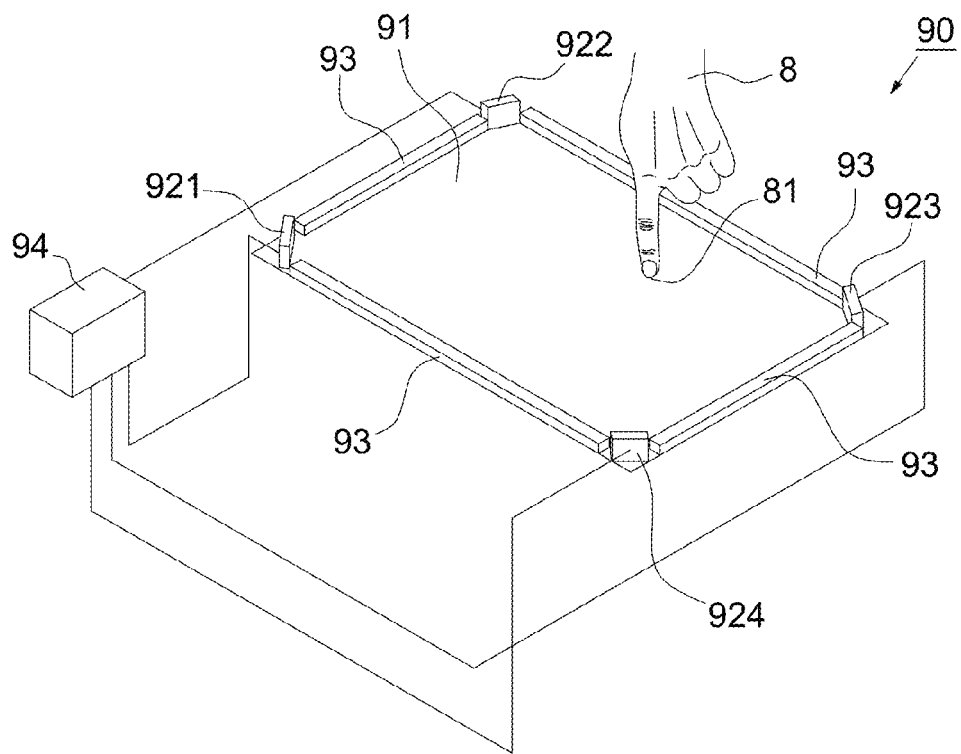
FIG. 1 shows a block diagram of a conventional touch system.
Figure 2A:
FIGS. 2a-2c show schematic diagrams of image windows captured by an image sensor in the touch system shown in FIG. 1.
Figure 2B:
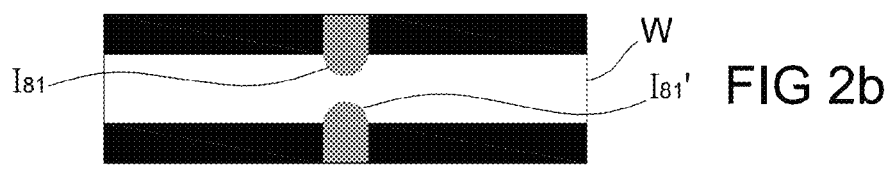
Figure 2C:
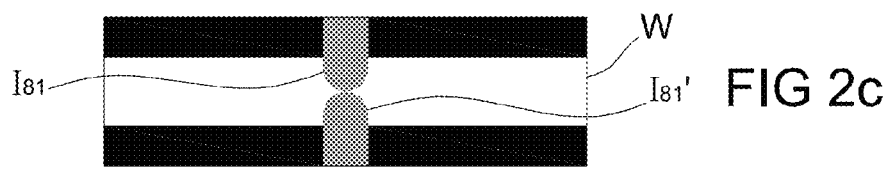
Figure 3A:
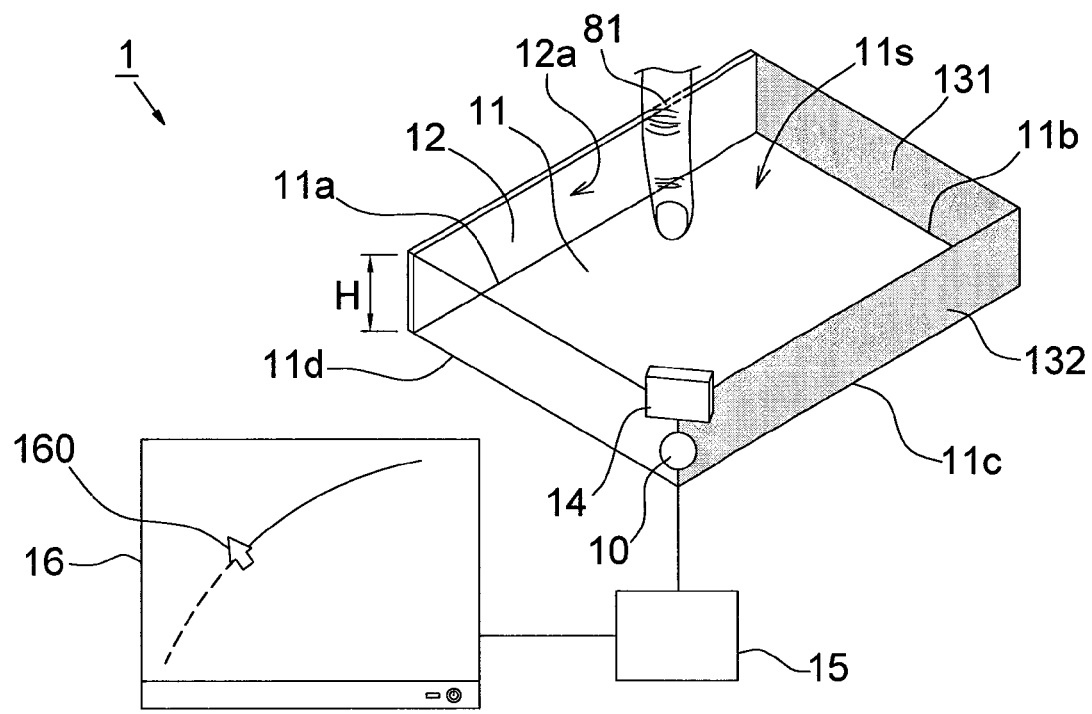
FIG. 3a shows a block diagram of the touch system according to the first embodiment of the present invention.
Figure 3B:
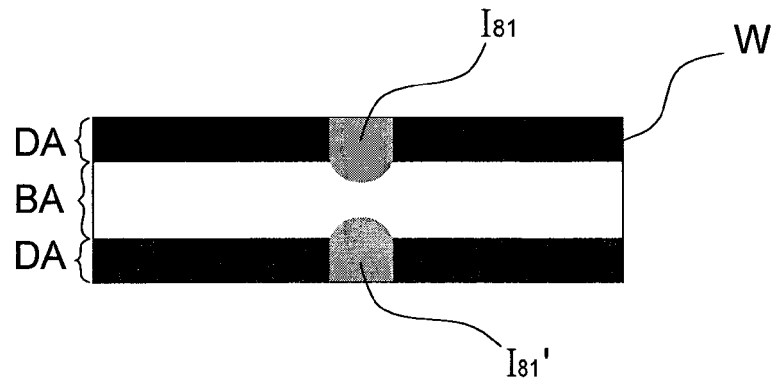
Figure 3C:
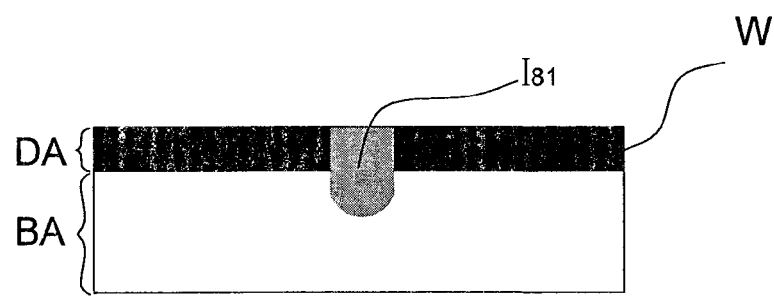

Please refer to FIGS. 3a to 3c, FIG. 3a shows a block diagram of the touch system 1 according to the first embodiment of the present invention; FIGS. 3b and 3c respectively show a schematic diagram of an image window captured by the image sensor in FIG. 3a. The touch system 1 includes a light source 10, a plate 11, a reflecting mirror 12, a first reflecting unit 131, a second reflecting unit 132, an image sensor 14, a processing unit 15 and an image display 16.

The light source 10 is preferably disposed at a corner of the plate 11. The light source 10 emits invisible light, e.g. IR light or ultraviolet light, to be reflected by the reflecting mirror 12, the first reflecting unit 131 and the second reflecting unit 132. The light source 10 may also be disposed at other location as long as the light emitted therefrom can be reflected by the reflecting mirror 12, the first reflecting unit 131 and the second reflecting unit 132, and thus the location of the light source 10 is not limited to that shown in FIG. 3a.

The plate 11 includes a first side 11a, a second side 11b, a third side 11c, a fourth side 11d and a plate surface 11s. Embodiments of the plate 11 include a white board and a touch screen. The plate surface 11s may be a reflecting mirror or a reflecting surface. The plate surface 11s and a region thereabove surrounded by the reflecting mirror 12, the first reflecting unit 131 and the second reflecting unit 132 define a touch area, with a height H, of the touch system 1, wherein the height H may be determined according to the actual application.

The reflecting mirror 12 is disposed at the first side 11a of the plate 11 and extends a height H from the plate surface 11s (i.e. toward the touch region). The reflecting mirror 12 has a reflecting surface 12a facing the third side 11c of the plate 11 to reflect the invisible light emitted from the light source 10, wherein the reflecting surface 12a may be made of any suitable material. The first reflecting unit 131 is disposed at the second side 11b of the plate 11 and extends the height 11 from the plate surface 11s, wherein the first reflecting unit 131 may be, for example, a reflecting cloth made of any suitable material and faces the fourth side 11d of the plate 11 to reflect the invisible light emitted from the light source 10. The second reflecting unit 132 is disposed at the third side 11c of the plate 11 and extends the height H from the plate surface 11s, wherein the second reflecting unit 132 may be, for example, a reflecting cloth made of any suitable material and faces the first side 11a of the plate 11 to reflect the invisible light emitted from the light source 10. It should be noted that the reflecting mirror 12, first reflecting unit 131 and second reflecting unit 132 may have different heights.

The image sensor 14 is preferably disposed at a corner of the plate 11. For example in this embodiment, the image sensor 14 and the light source 10 are disposed at the intersection between the third side 11c and the fourth side 11d, while the reflecting mirror 12 may be disposed at a side of the plate surface 11s that is not adjacent to the image sensor 14, e.g. the first side 11a or the second side 11b. A field of view of the image sensor 14 may lean toward the plate surface 11s to capture image windows looking across the plate surface 11s and encompassing the touch region defined by the plate surface 11s, the reflecting mirror 12, the first reflecting unit 131 and the second reflecting unit 132, wherein a longitudinal field of view of the image sensor 14 is preferably larger than the height H of the touch region. When a pointer, e.g. a finger 81, approaches the plate surface 11s, the image sensor 14 captures an image window W containing an image $I_{81}$ of the tip of the finger 81 blocking the reflecting mirror 12 or the first reflecting unit 131 and/or containing an image $I_{81}'$ of the mirror image of finger 81 in the plate surface 11s as shown in FIG. 3b. In FIG. 3b, since the longitudinal field of view of the image sensor 14 (i.e. the height of the image window) is larger than the height H of the touch region, the image window W includes a bright area BA and a background area DA, wherein a height of the bright area BA is determined by the plate surface 11s, the reflecting mirror 12, the first reflecting unit 131 and the second reflecting unit 132. DA is a background area outside the reflecting mirror 12, the first reflecting unit 131, the second reflecting unit 132 and the plate surface 11s and since theses areas do not have any reflecting component to reflect the light emitted from the light source 10, DA will be dark (or black) in the image window W captured by the image sensor 14. When the pointer contacts the plate surface 11s, the images $I_{81}$ and $I_{81}'$ shown in FIG. 3b will connect to each other.

In another embodiment, the plate surface 11s may not be a reflecting mirror, and the image sensor 14 captures an image window looking across the plate surface 11s and encompassing only the reflecting mirror 12, the first reflecting unit 131, the second reflecting unit 132 and the background area above the reflecting mirror 12, the first reflecting unit 131 and the second reflecting unit 132 without encompassing the plate surface 11s. When the finger 81 approaches the plate surface 11s, the image sensor 14 may capture an image window W containing an image $I_{81}$ of the tip of the finger 81 blocking the reflecting mirror 12, the first reflecting unit 131 or the second reflecting unit 132 as shown in FIG. 3c, wherein BA refers to a bright area whose height is determined by the reflecting mirror 12, the first reflecting unit 131 and the second reflecting unit 132. DA refers to a background area above the reflecting mirror 12, the first reflecting unit 131 and the second reflecting unit 132. When the pointer contacts the plate surface 11s, the image $I_{81}$ shown in FIG. 3c will connect to the bottom of the image window W. Embodiments of the image sensor 14 include, but not limited to, a CCD image sensor and a CMOS image sensor. It should be understood that the pointer may be replaced with other objects and is not limited to a finger.

The processing unit 15 is coupled to the image sensor 14 for processing image windows captured by the image sensor 14 and calculates a three dimensional coordinate of the pointer relative to the plate surface 11s, including a second dimensional plane coordinate of the pointer relative to the plate surface 11s and a height coordinate of the pointer from the plate surface 11s, according to an image associated with a pointer and a variation of each column of pixels, e.g. a standard deviation of one column of pixels or an average of absolute values of the differences between each pixel value and an average pixel value of one column of pixels, in the image window. The processing unit 15 also controls the touch system 1 to execute different functions according to the height coordinate and the second dimensional plane coordinate.

For example, when the processing unit 15 identifies that a pointer is hovering (i.e. approaching but not touching) above the plate surface 11s with a first height coordinate, the processing unit 15 calculates a second dimensional plane coordinate of the pointer relative to the plate surface 11s according to an image position in the image window W associated with the pointer, and controls the motion of a cursor 160 shown on the image display 16 according to a change of the second dimensional plane coordinate between successive image windows, wherein the second dimensional plane coordinate of the plate surface 11s may correspond to the plane coordinate of a screen of the image display 16.

For example, when the processing unit 15 identifies that a pointer is hovering above the plate surface 11s with a second height coordinate, which is closer to the plate surface 11s than the first height coordinate, the processing unit 15 calculates a second dimensional plane coordinate of the pointer relative to the plate surface 11s according to an image position in the image window W associated with the pointer and controls the cursor 160 shown on the image display 16 to perform, for example, a writing or a drawing function according to the change of the second dimensional plane coordinate between successive image windows.

For example, when the processing unit 15 identifies that a pointer contacts the plate surface 11s, the processing unit 15 calculates a second dimensional plane coordinate of the pointer relative to the plate surface 11s according to an image position in the image window W associated with the pointer, and controls the cursor 160 shown on the image display 16 to perform, for example, a writing or a drawing function with different characteristics, for example, but not limited to, with a wider line or a different color, according to the change of the second dimensional plane coordinate between successive image windows.

In FIG. 3a, in order to clearly show the touch system 1 of the present invention, the plate 11 is separated from the image display 16, but this is not a limitation of the present invention. In other embodiment, the plate 11 may be integrated on the screen of the image display 16. In addition, when the image display 16 is a touch screen, the screen of the image display 16 may also be served as the plate 11 and the reflecting mirror 12, the first reflecting unit 131 and the second reflecting unit 132 are disposed on the screen of the image display 16.

It is appreciated that although the plate 11 is shown as a rectangular and the reflecting mirror 12, the first reflecting unit 131 and the second reflecting unit 132 are perpendicularly disposed on three sides of the plate 11 in FIG. 3a, it is only an embodiment not a limitation of the present invention. In other embodiment, the plate 11 may be made in other shapes; and the reflecting mirror 12, the first reflecting unit 131 and the second reflecting unit 132 may be disposed on the plate 11 with other spatial relationships.

Figure 4A:
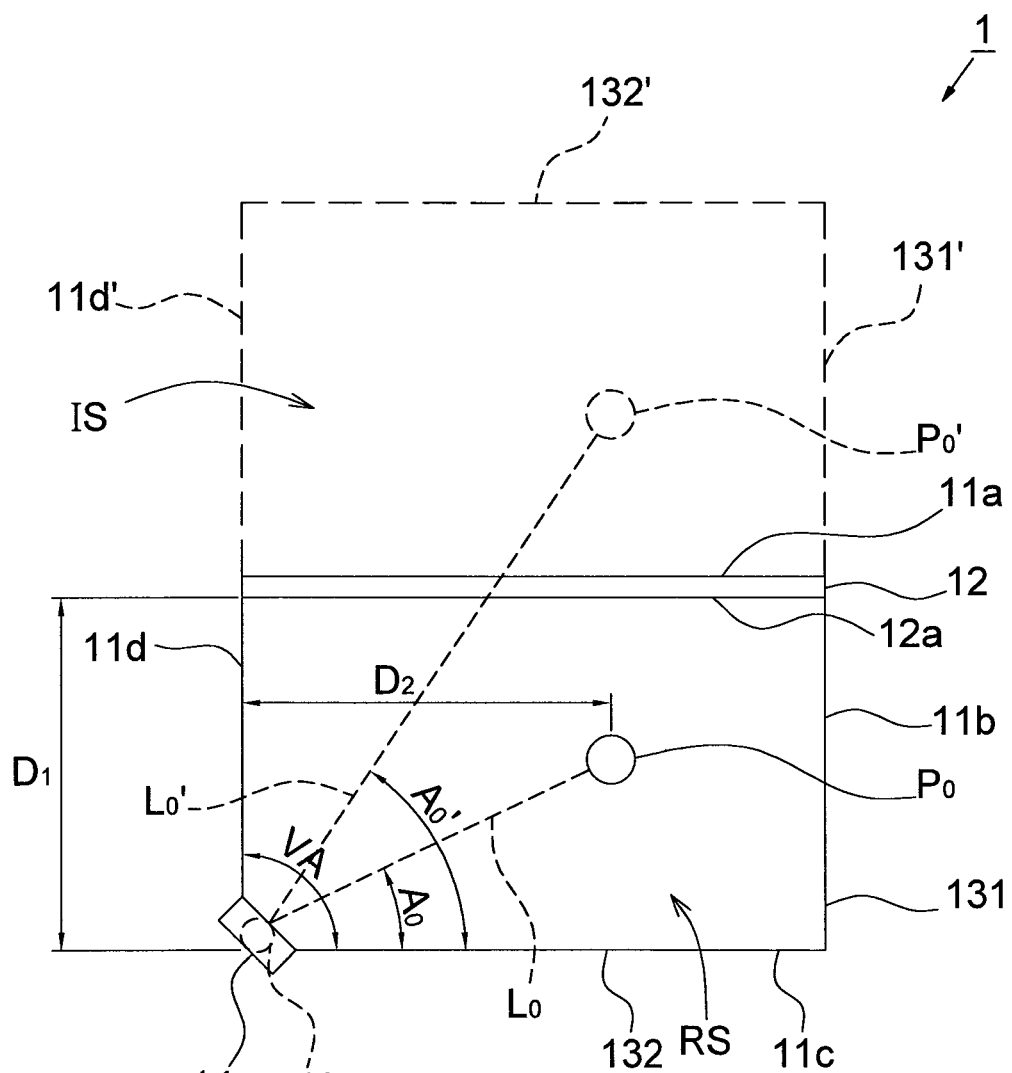
FIG. 4a shows an operational schematic diagram of the touch system according to the first embodiment of the present invention.
Figure 4B:
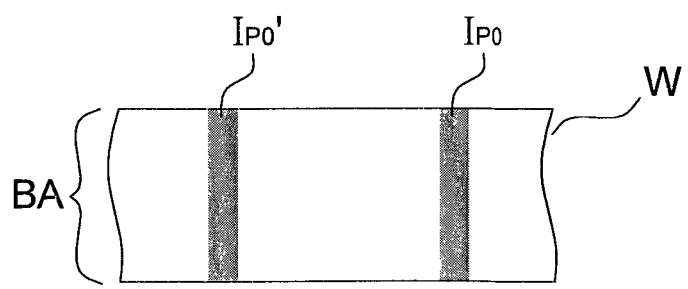

Please refer to FIGS. 4a and 4b, FIG. 4a shows an operational schematic diagram of the touch system 1 according to the first embodiment of the present invention and FIG. 4b shows a schematic diagram of an image window W captured by the image sensor shown in FIG. 4a. In this embodiment, the first reflecting unit 131 maps a second mirror image 131' with respect to the reflecting surface 12a; the second reflecting unit 132 maps a third mirror image 132' with respect to the reflecting surface 12a; and the fourth side 11d of the plate 11 maps a fourth mirror image 11d' with respect to the reflecting surface 12a, wherein the reflecting mirror 12, the first reflecting unit 131, the second reflecting unit 132 and the fourth side 11d of the plate 11 together define a real space RS, while the reflecting mirror 12, the second mirror image 131', the third mirror image 132' and the fourth mirror image 11d' together define a virtual space IS.

A transversal field of view VA of the image sensor 14 looks across the plate surface 11s and encompasses at least the real space RS and the virtual space IS. The image sensor 14 is configured to capture an image window encompassing the real space RS, the virtual space IS and the image associated with a pointer, e.g. a finger, in the touch region of the real space RS blocking the reflecting mirror 12, the first reflecting unit 131, the second reflecting unit 132 and/or the plate surface 11s. In an embodiment, the image sensor 14 may further include a lens (or lens set) for adjusting the transversal field of view VA thereof such that the image sensor 14 may capture a complete image window encompassing the real space RS and the virtual space IS.

Next, the method that the processing unit 15 calculates a two dimensional plane coordinate of a pointer relative to the plate surface 11s is illustrated hereinafter. Please refer to FIG. 4a again, when a pointer, e.g. a finger 81, enters the touch region, a touch point $P_0$ is formed in the real space RS and the pointer maps a first mirror image $P_0'$ in the virtual space IS with respect to the reflecting surface 12a of the reflecting mirror 12. The image sensor 14 captures an image of the tip of the pointer following the first route $L_0$ to form an image $I_{P0}$ in the image window W, and captures an image of the tip of the first mirror image $P_0'$ following the second route $L_0'$ to form an image $I_{P0}'$ in the image window W as shown in FIG. 4b. In this embodiment, relationships between one dimensional positions of the image in the image window W and included angles between different routes and the third side 11c of the plate 11 are pre-stored in the processing unit 15. Accordingly, when the image sensor 14 captures the image of the tip of the pointer and the first mirror image to form the image window W, the processing unit 15 may respectively obtain a first included angle $A_0$ and a second included angle $A_0'$ according to one dimensional position of the images in the image window W. Next, by using triangulation, the processing unit 15 may obtain the two dimensional plane coordinate of the touch point $P_0$ pointed by the pointer inside the touch region.

For example in an aspect, the plate surface 11s forms a rectangular coordinate system, wherein the third side 11c is served as an X-axis, the fourth side 11d is served as a Y-axis and the location of the image sensor 14 is served as an origin of the rectangular coordinate system. Accordingly, the coordinate of a touch point $P_0$ inside the rectangular coordinate system may be expressed as (a distance to the fourth side 11d, a distance to the third side 11c). In addition, a distance $D_1$ between the first side 11a and the third side 11c of the plate 11 is pre-stored in the processing unit 15. In this manner, the processing unit 15 may obtain the two dimensional plane coordinate of the touch point $P_0$ of the pointer 81 according to the following steps: (a) the processing unit 15 obtaining a first included angle $A_0$ between the first route $L_0$ and the third side 11c of the plate 11, and a second included angle $A_0'$ between the second route $L_0'$ and the third side 11c of the plate 11; (b) obtaining a distance $D_2$ between the touch point $P_0$ of the pointer 81 and the fourth side 11d of the plate 11 according to equation $D_2 = 2D_1/(\tan A_0 + \tan A_0')$; and (c) obtaining the y coordinate of the touch point $P_0$ according to equation $D_2 \times \tan$ $A_0$. Accordingly, the two dimensional plane coordinate of the touch point $P_0$ may be expressed as ($D_2$, $D_2 \times \tan A_0$). It is appreciated that the method for calculating the two dimensional plane coordinate mentioned above is only exemplary but not restrictive to the present invention. The two dimensional plane coordinate of the touch point $P_0$ may be obtained through other triangulation processes.

Second Embodiment

Figure 5A:
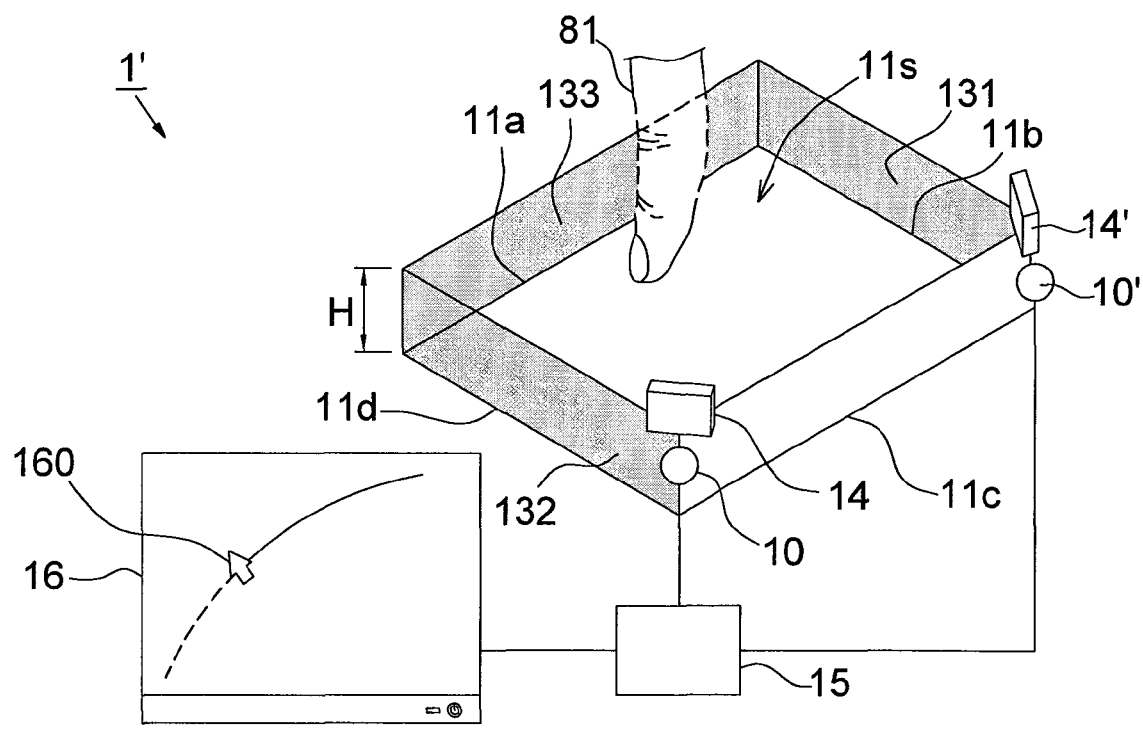
FIG. 5a shows a block diagram of the touch system according to the second embodiment of the present invention.
Figure 5B:
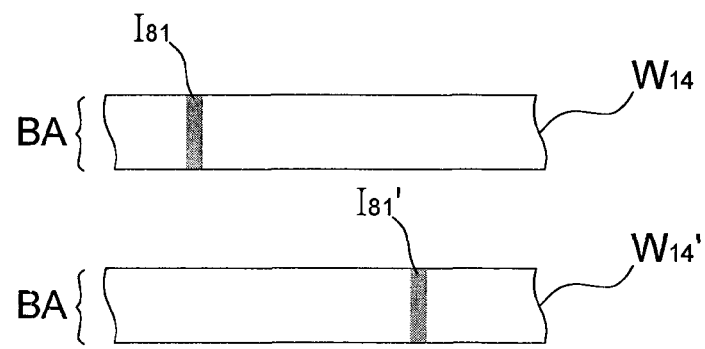

Please refer to FIGS. 5a-5b, FIG. 5a shows a block diagram of the touch system 1' according to the second embodiment of the present invention, and FIG. 5b shows image windows respectively captured by the image sensors shown in FIG. 5a. Differences between this embodiment and the first embodiment are that the reflecting mirror 12 of the first embodiment is replaced by a third reflecting unit 133 in this embodiment, and the touch system 1' includes two image sensors 14 and 14'. In other embodiment, in order to enhance the reflection efficiency of the reflecting units 131-133, this embodiment may further include a second light source 10' disposed, for example, at the same corner of the plate surface 11s as the image sensor 14'.

In the second embodiment, the touch system 1' includes a plate 11, a light source 10, a first reflecting unit 131, a second reflecting unit 132, a third reflecting unit 133, two image sensors 14 and 14', a processing unit 15, and an image display 16. The first reflecting unit 131, the second reflecting unit 132 and the third reflecting unit 133 are respectively disposed at the second side 11b, the fourth side 11d and the first side 11a of the plate 11 and extends a height H from the plate surface 11s so as to define a touch region, wherein the height H may be determined according to the actual application. The reflecting units 131-133 may be reflecting cloth made of any suitable material and face the touch region of the plate to reflect the invisible light emitted from the light source 10(10'). In this embodiment, the image sensor 14 is disposed at the intersection of the third side 11c and the fourth side 11d, and a field of view thereof may or may not encompass the plate surface 11s. The image sensor 14' is disposed at the intersection of the second side 11b and the third side 11c, and a field of view thereof may or may not encompass the plate surface 11s, wherein the longitudinal fields of view of the image sensors 14 and 14' are preferably larger than the height H. When a pointer, e.g. a finger 81, enters the touch region, the image sensor 14 captures an image window $W_{14}$ containing an image $I_{81}$ associated with the tip of the finger 81 while the image sensor 14' captures an image window $W_{14}'$ containing an image $I_{81}'$ associated with the tip of the finger 81. It should be noted that FIG. 5b only shows the bright area BA and omits the background area DA.

The processing unit 15 is coupled to the image sensors 14 and 14' for processing image windows captured thereby, for calculating a three dimensional coordinate of the pointer relative to the plate surface 11s according to the images associated with a pointer in the image windows, and for controlling the touch system 1' to execute corresponding functions according to the three dimensional coordinates, wherein the calculation of a touch point corresponding to the two dimensional plane coordinate of the plate surface 11s may also be performed by using triangulation and details thereof are similar to that described in the first embodiment and thus will not be repeated herein.

Please refer to FIGS. 6a-6d, the method of calculating a height coordinate of a pointer relative to the touch system 1 or 1' (the plate surface 11s) of the present invention will be illustrated hereinafter. It is appreciated that the calculation explained herein may be adapted to aforementioned first and the second embodiments.

Figure 6A:
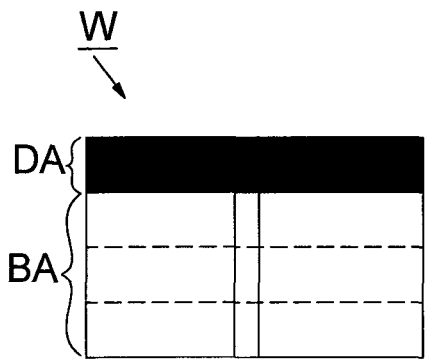
FIG. 6a shows a schematic diagram of an image window captured by the image sensor of the touch system according to the embodiments of the present invention, wherein the image window includes no pointer image.

FIG. 6a shows a schematic diagram of an image window W captured by the image sensor of the touch system according to the embodiment of the present invention, wherein the image window includes a bright area BA and a background area DA, and it is assumed that each column of pixels of the image window W includes N pixels. At this moment, as the pointer does not enter the touch region, the image window W does not contain any image information. In the present invention, a height coordinate of a pointer relative to the plate 11 may be obtained through calculating a variation of every column of pixels in the image window W.

Figure 6C:
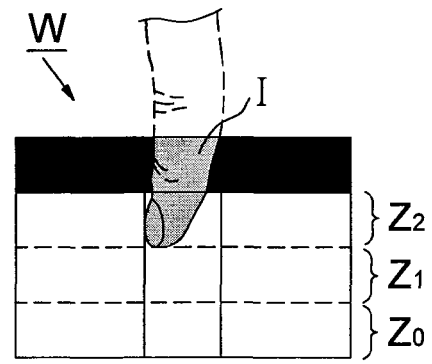
FIG. 6c shows a schematic diagram of another image window captured by the image sensor of the touch system according to the embodiments of the present invention, wherein the image window includes a pointer image.
Figure 6B:
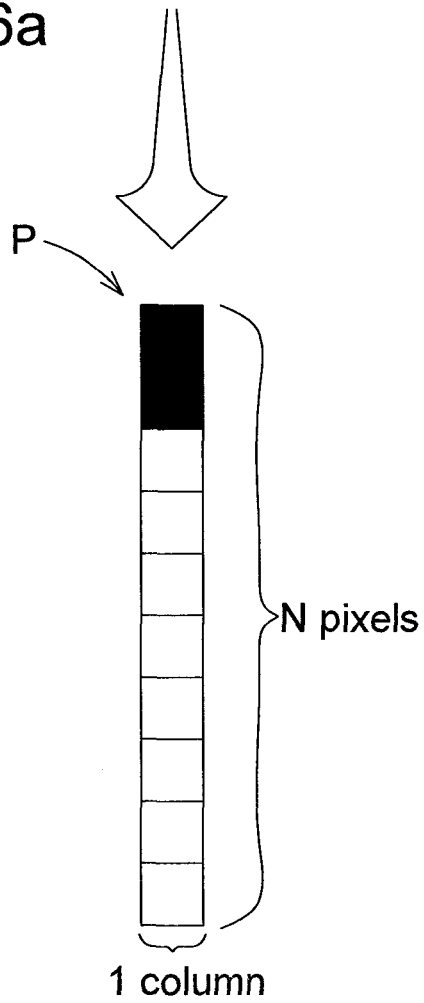

FIG. 6b shows one column of pixels P of the image window shown in FIG. 6a, and herein a standard deviation of the column of pixels P may be shown as $$\sigma_b^k = \sqrt{\frac{1}{N}\sum_{i=1}^{N}(x_i^k - \bar{x}^k)^2}, \quad (1)$$

and an average of absolute values of the differences between each pixel value and an average pixel value of one column of pixels P may be shown as, $$v_b^k = \frac{1}{N}\sum_{i=1}^{N}|x_i^k - \bar{x}^k|, \quad (2)$$

wherein $x_i^k$ is a pixel value of the ith pixel in the kth column of pixels; $\bar{x}^k$ is an average pixel value of the kth column of pixels. As the brightness difference of the bright area BA and the background are DA is large, the variation (e.g. the standard deviation $\sigma_b^k$ or the average $v_b^k$) of every column of pixels is the largest when the image window W does not contain any image of pointer.

Figure 6D:
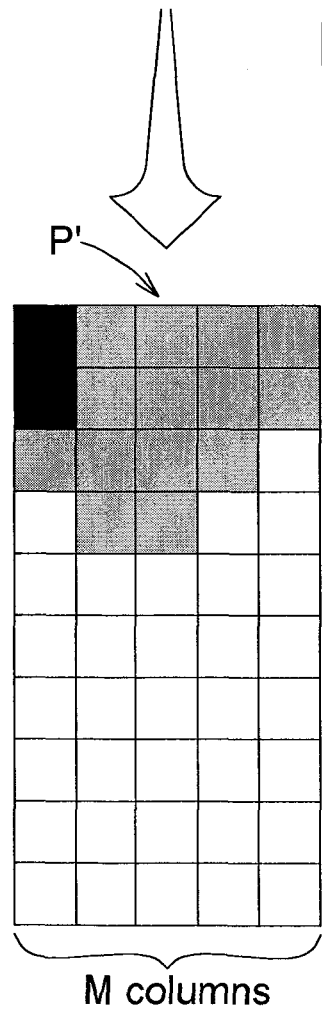
FIG. 6d shows a schematic diagram of a plurality of columns of pixels of the image window shown in FIG. 6c.

FIG. 6c shows a schematic diagram of an image window W captured by the image sensor of the touch system according to the embodiment of the present invention, wherein the image window W contains the image I of a pointer. Referring to FIGS. 3a and 5a, when a pointer enters the touch region, the pointer will be illuminated by the light source 10. Therefore, in the image window W captured by the image sensor, the brightness of the image I associated with the pointer is between that of the bright area BA and the background area DA. In other word, the variation of the column of pixels, e.g. equation (1) or (2), that contains the image I will decrease. For example, FIG. 6d shows a schematic diagram of a plurality of columns of pixels containing the image I, wherein the black region refers to the background area, the gray region refers to the image I, and the white area refers to the bright area; and P' is a column of pixels containing the image I. When the pointer is closer to the plate surface 11s, the variation of the column of pixels P' will become lower; and when the pointer contacts the plate surface 11s, the variation of the column of pixels P' is the lowest. Therefore in the present invention a plurality of thresholds are pre-stored in the processing unit 15. When the processing unit 15 is processing the image window W captured by the image sensor, it compares the variation of at least one column of pixels with the smallest variation in the image window W (e.g. there are two columns of pixels have the smallest variation in FIG. 6d) and the thresholds so as to identify the height coordinate of the pointer.

Please refer to FIGS. 6c and 6d again, for example in an embodiment, variations of every column of pixels in an image window without containing the image of a pointer and three thresholds Th1-Th3 are stored in the processing nit 15. For example, when the size of an image window is 640×42, 640 variations and three thresholds are stored in the processing unit 15. In one embodiment, it is assumed that Th1<Th2<Th3, and thus when the processing unit 15 obtains that the variation of at least one column of pixels with the smallest variation in the image window W is smaller than Th1, it identifies that the height coordinate of the pointer is $Z_0$; when the processing unit 15 obtains that the variation of at least one column of pixels with the smallest variation in the image window W is between Th1 and Th2, it identifies that the height coordinate of the pointer is $Z_1$; when the processing unit 15 obtains that the variation of at least one column of pixels with the smallest variation in the image window W is between Th2 and Th3, it identifies that the height coordinate of the pointer is $Z_2$; and when the processing unit 15 obtains that the variation of at least one column of pixels with the smallest variation in the image window W is larger than Th3, it identifies that no pointer enters the touch region and thus deactivates the touch system. It should be mentioned that the calculation of the height coordinate of a pointer relative to the plate 11 mentioned above may also be adapted to the image window shown in FIG. 3b. Furthermore, the expression of the variation is not limited to equations (1) and (2).

In addition, the present invention may also be set as when the processing unit 15 identifies that the variation of any at least one column of pixels in the image window (including the column of pixels with the smallest variation) is smaller than a first threshold, it activates the touch system; and when the processing unit 15 identifies that the variation of any at least one column of pixels in the image window is smaller than a second threshold, it identifies that the pointer is in contact with the plate surface 11s.

In an aspect, when the processing unit 15 identifies that the height coordinate of the pointer is $Z_2$, it controls the motion of a cursor shown on an image display 16 according to a change of two dimensional plane coordinates in the touch region; when the processing unit 15 identifies that the height coordinate of the pointer is $Z_1$, it controls the cursor shown on an image display 16 to perform a writing or a drawing function according to the change of two dimensional plane coordinates in the touch region; and when the processing unit 15 identifies that the height coordinate of the pointer is $Z_0$, it controls the cursor shown on an image display 16 to write or draw with different line characteristics according to the change of two dimensional plane coordinates in the touch region.

It is appreciated that the number of thresholds may be determined according to the actual requirement and the function that the processing unit 15 controls the touch system 1 or 1' to execute may be based on different settings and not limited to those illustrated herein.

As mentioned above, as the conventional touch system can not obtain the hovering height of a pointer, the operating function of the touch system is limited. The present invention further provides a touch system (as shown in FIGS. 3a and 5a) capable of calculating three dimensional coordinates of a pointer and performing different functions according to different changes of the height coordinates and plane coordinates.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A pointer height detection method for a touch system, the pointer height detection method comprising:
    capturing an image window looking across a plate surface with at least one image sensor;
    calculating a variation of each column of pixels in the image window;
    calculating a smallest variation of a variation of each column of pixels in the image window when the image window contains an image of a pointer; and
    comparing a value of the smallest variation with at least one threshold to identify a height of the pointer relative to the plate surface, wherein
    the at least one threshold defines a predetermined height of the pointer associated with the value of the smallest variation.

2. The pointer height detection method as claimed in claim 1, further comprising:
    controlling an image display to execute a corresponding function according to the height identified.

3. The pointer height detection method as claimed in claim 2, wherein the corresponding function is a cursor motion, a writing function or a drawing function.

4. The pointer height detection method as claimed in claim 1, further comprising:
    activating the touch system when the variation of any column of pixels in the image window is smaller than a first threshold.

5. The pointer height detection method as claimed in claim 4, further comprising:
    processing the image window to detect at least one image position associated with pointer in the image window; and
    calculating a plane coordinate of the pointer relative to the plate surface according to the image position.

6. The pointer height detection method as claimed in claim 1, further comprising:
    identifying that the pointer contacts the plate surface when the variation of any column of pixels in the image window is smaller than a second threshold.

7. The pointer height detection method as claimed in claim 1, wherein a field of view of the image sensor encompasses the plate surface.

8. The pointer height detection method as claimed in claim 1, further comprising:
    providing at least one reflecting unit to reflect light needed by the image sensor for capturing images, wherein a longitudinal field of view of the image sensor is larger than a height of the reflecting unit.

9. The pointer height detection method as claimed in claim 1, wherein the variation is a standard deviation of one column of pixels or an average of absolute values of the differences between each pixel value and an average pixel value of one column of pixels.

10. A pointer coordinate detection method for a touch system, the pointer coordinate detection method comprising:
    capturing an image window looking across a plate surface with at least one image sensor;
    calculating a smallest variation of a variation of each column of pixels in the image window when the image window contains an image of a pointer;
    identifying a height coordinate of the pointer relative to the touch system according to a relationship between a value of the smallest variation and at least one threshold, wherein the at least one threshold defines a predetermined height coordinate of the pointer associated with the value of the smallest variation; and calculating a plane coordinate of the pointer relative to the touch system according to an image position associated with the pointer in the image window.

11. The pointer coordinate detection method as claimed in claim 10, further comprising:

providing at least one reflecting minor and at least one reflecting unit to reflect light needed by the image sensor for capturing images, wherein the image in the image window is formed by the pointer blocking the reflecting minor or the reflecting unit.

12. The pointer coordinate detection method as claimed in claim 10, further comprising:

calculating a variation of each column of pixels in the image window; and comparing the variation of at least one column of pixels with the smallest variation and the at least one threshold to identify the height coordinate.

13. The pointer coordinate detection method as claimed in claim 12, further comprising:

activating the touch system when the variation of any column of pixels in the image window is smaller than a first threshold.

14. The pointer coordinate detection method as claimed in claim 12, further comprising:

identifying that the pointer contacts the plate surface when the variation of any column of pixels in the image window is smaller than a second threshold.

15. The pointer coordinate detection method as claimed in claim 10, further comprising:

controlling an image display to execute a corresponding function according to the height coordinate and the plane coordinate.

16. The pointer coordinate detection method as claimed in claim 15, wherein the corresponding function is a cursor motion, a writing function and a drawing function.

17. The pointer coordinate detection method as claimed in claim 10, wherein the variation is a standard deviation of one column of pixels or an average of absolute values of the differences between each pixel value and an average pixel value of one column of pixels.

18. A touch system, comprising:

a plate, having a plate surface;

at least one light source, configured to illuminate the plate along the plate surface;

at least one reflecting unit, configured to reflect light from the light source;

at least one image sensor, configured to capture an image window containing an image of a pointer blocking the reflecting unit; and a processing unit configured to process the image window, calculate a smallest variation of a variation of each column of pixels in the image window when the image window contains an image of a pointer, and identify a height coordinate of the pointer relative to the plate surface according to a relationship between a value of the smallest variation and at least one threshold, wherein the at least one threshold defines a predetermined height coordinate of the pointer associated with the value of the smallest variation.

19. The touch system as claimed in claim 18, wherein the image sensor is disposed in a corner intersected by two sides of the plate surface, and the touch system further comprises a reflecting mirror disposed at a side of the plate surface not adjacent to the image sensor.

20. The touch system as claimed in claim 18, wherein the processing unit is further configured to compare the variation of at least one column of pixels with the smallest variation and the at least one threshold to identify the height coordinate.

21. The touch system as claimed in claim 18, wherein the processing unit is further configured to identify a plane coordinate of the pointer relative to the plate surface according to an image position associated with the pointer in the image window.

22. The touch system as claimed in claim 21, further comprising:

an image display coupled to the processing unit, wherein the processing unit is further configured to control the image display to execute a corresponding function according to the height coordinate and the plane coordinate.

23. The touch system as claimed in claim 18, wherein the variation is a standard deviation of one column of pixels or an average of absolute values of the differences between each pixel value and an average pixel value of one column of pixels.

* * * * *